United States Patent
Takhim

(10) Patent No.: US 6,989,136 B2
(45) Date of Patent: Jan. 24, 2006

(54) METHOD FOR PRODUCING PHOSPHORIC ACID

(75) Inventor: Mohamed Takhim, Khouribga (MA)

(73) Assignee: ECOPHOS, Louvain-La-Neuve (BE)

( * ) Notice: Subject to any disclaimer, the term of this patent is extended or adjusted under 35 U.S.C. 154(b) by 320 days.

(21) Appl. No.: 10/343,644

(22) PCT Filed: Aug. 2, 2001

(86) PCT No.: PCT/BE01/00128

§ 371 (c)(1),
(2), (4) Date: Apr. 3, 2003

(87) PCT Pub. No.: WO02/12120

PCT Pub. Date: Feb. 14, 2002

(65) Prior Publication Data
US 2004/0013594 A1    Jan. 22, 2004

(30) Foreign Application Priority Data
Aug. 3, 2000   (BE) ................................. 2000/0489

(51) Int. Cl.
*C01B 25/22*   (2006.01)
(52) U.S. Cl. .................................... 423/319; 423/157.3
(58) Field of Classification Search ............. 423/157.3, 423/319
See application file for complete search history.

(56) References Cited

U.S. PATENT DOCUMENTS

| | | | |
|---|---|---|---|
| 995,894 A | * | 6/1911 | Palmaer .................... 423/157.3 |
| 2,152,364 A | * | 3/1939 | Seyfried ...................... 423/158 |
| 3,323,864 A | | 6/1967 | Lapple |
| 3,387,930 A | * | 6/1968 | Schertzer et al. ............ 423/319 |
| 3,401,014 A | * | 9/1968 | Saeman ...................... 423/161 |
| 3,425,837 A | * | 2/1969 | Conte et al. ................. 426/648 |
| 3,556,724 A | * | 1/1971 | Fuchs et al. ................. 423/320 |
| 3,843,767 A | * | 10/1974 | Faust et al. ............... 423/157.3 |
| 3,988,420 A | * | 10/1976 | Loewy et al. ................ 423/157 |
| 4,088,738 A | * | 5/1978 | Hauge ......................... 423/319 |
| 4,108,957 A | | 8/1978 | Michel |

FOREIGN PATENT DOCUMENTS

DE          3438655      *   4/1986

(Continued)

OTHER PUBLICATIONS

Database Chemabs, Chemical Abstracts Service, Columbus, Ohio, U.S., E. Diaz Nogueira et al., "Wet Process for Manufacture of Phosphoric Acid from Phosphate Rock Using Hydrochloric Acid" from ES 2013211A (Ercros S.A. Spain), Apr. 16, 1990.

*Primary Examiner*—Wayne A. Langel
(74) *Attorney, Agent, or Firm*—Dykema Gossett PLLC

(57) ABSTRACT

The invention concerns a method for producing phosphoric acid, which consists in: at least an attack of phosphate ore with an attacking liquid containing soluble phosphate ions, forming of an attacking product, separating in the attacking product between an insoluble solid phase containing impurities and a liquid phase having soluble phosphate ions and calcium ions, introducing in the separated liquid phase an acid stronger than phosphoric acid and which forms, with said calcium ions, a soluble calcium salt, and isolating a solution of said calcium salt, not contaminated by the impurities, thereby obtaining a phosphoric acid solution.

12 Claims, 2 Drawing Sheets

U.S. PATENT DOCUMENTS

| | | | | |
|---|---|---|---|---|
| 4,222,990 | A | * | 9/1980 | Drechsel .................... 423/158 |
| 4,387,077 | A | * | 6/1983 | Weterings et al. ......... 423/21.1 |
| 4,393,030 | A | * | 7/1983 | Sardisco et al. ......... 423/157.3 |
| 4,393,032 | A | * | 7/1983 | Drechsel et al. ............ 423/320 |
| 4,435,370 | A | * | 3/1984 | Holcomb et al. ........... 423/158 |

FOREIGN PATENT DOCUMENTS

| | | |
|---|---|---|
| EP | 0087323 | 8/1983 |
| FR | 1082404 | 12/1954 |
| FR | 2343698 | 10/1977 |

* cited by examiner

METHOD FOR PRODUCING PHOSPHORIC ACID

BACKGROUND OF THE INVENTION

1. Field of the Invention

The present invention relates to a method of producing phosphoric acid starting from phosphate ores.

2. The Prior Art

The production of phosphoric acid, if synthesis is excluded, takes place today principally by two methods: either by the "dry" method, which consumes a great deal of energy, in high-temperature "ore-coke-silica" furnaces, followed by bubbling through of the $P_2O_5$ which is extracted in $H_2O$, or by the "wet" method of attacking with acid, principally sulphuric acid, but also nitric, hydrochloric or perchloric acids, of preconditioned (calcination, grinding, sieving) phosphate ores, with the obtaining of a raw phosphoric acid solution. The Ca salts formed, following the attack acid, are eliminated by the crystallisation of the sulphates (from 80° C. to 110° C.), or nitrates (at a temperature of <−5° C. and low filterability) or by carrying out a liquid/liquid extraction of the phosphoric acid by separating it from the calcium chlorides.

The resulting product of these attacks with acid contains all the impurities already existing in the extracted ore. These impurities then contaminate not only the phosphoric acid produced but also the salts crystallised or separated by extraction. This contamination is such that it makes these salts difficult if not impossible to make use of. There exists at the present time a real problem in the exploitation of the gypsum formed during the sulphuric attack. It is necessary to know that the production of 1 tonne of $H_3PO_4$ expressed as $P_2O_5$ involves the production or more or less 5 tonnes of gypsum in a form which is difficult to exploit at the present time.

Moreover, these attacks all require expensive preconditioning. A fine grinding of the extracted ore is for example absolutely necessary if it is wished to obtain a correct yield by sulphuric attack.

The majority of these methods involve high-temperature reactions which require expensive cooling. The temperature in the liquid-solid attack reactions are difficult to control and these high-temperature attack environments are very detrimental to the equipment.

Various methods are also known comprising an attack on the ore by phosphoric acid or a mixture of several acids, one of which is phosphoric acid (FR-A-2.343.696, U.S. Pat. No. 3,323,864, FR-1.082.404 and EP-A-0 087 323). These methods all involve, after this attack, precipitation of a calcium salt in the product obtained by means of an acid. In some of these methods the precipitated calcium salt still contains the original impurities in the ore, in others the acid used or one of the acids used is hydrofluoric acid or fluosilicic acid, which are expensive acids, which it is necessary to recycle and which are dangerous to handle given their toxicity.

The object of the present invention is a method of producing phosphoric acid making it possible to exploit the by-products to the maximum possible extent, or in any case to greatly reduce the cost of their elimination, whilst proposing a phosphoric acid yield equivalent to or greater than those provided by the known methods. Another purpose of the method is to produce a phosphoric acid suitable for producing fertilisers and for industrial applications, also with a view to obtaining a purified phosphoric acid.

Advantageously, this method must make it possible to avoid grinding or calcination of the extracted ore before the attack. The method according to the invention will preferably be able to be implemented at a temperature which is easily controllable and under conditions which allow reactions which do not greatly attack the equipment used, and control of the apportioning.

SUMMARY OF THE INVENTION

These problems have been resolved according to the invention by a method of producing phosphoric acid comprising at least one attack on phosphate ore by an attack liquid containing phosphate ions in solution, with the formation of an attack product, and a separation in the attack product between an insoluble solid phase containing impurities and a liquid phase having phosphate ions and calcium ions in solution, characterised in that it also comprises introduction into the separated liquid phase of an acid which is stronger than the phosphoric acid and which forms, with the aforementioned calcium ions, a soluble calcium salt, and isolation of a solution of this calcium salt, not contaminated by the impurities, with the obtaining of a solution of phosphoric acid.

The acid can for example be in this case hydrochloric acid and there is then obtained, as the salt, calcium chloride which is not contaminated by the impurities of the ore which is an exploitable product, for example as a spreading product for icy roads. It is also possible to envisage, as an acid of this type, perchloric acid, nitric acid etc. This method has the great advantage of an attack on the unground ore by a weak acid and elimination of the impurities normally encountered in phosphate ores as soon as the attack by an acid ends, phosphoric acid in this case. These impurities are for example Fe, Si, U, Cd, As, F, etc; they are only a little dissolved during the phosphoric attack on the ore according to the invention. Only the $Ca^{++}$ ion, whose content is relatively high in the mineral (up to 50%), is entrained in solution in the presence of the phosphate ions, forming in particular at a temperature close to the ambient temperature of the Ca dihydrogenophosphate. This allows, at the end of the method according to the invention, separation between a pure calcium salt and a phosphoric acid solution, the calcium-based by-product thus being able to be much more easily exploited given its high degree of purity. The aforementioned impurities are finally in the form of a concentrated solid residue, easily storable, because of its reduced volume.

In addition, fine grinding of the ore does not prove necessary prior to the attack. According to the invention, the calcium dihydrogenophosphate being soluble, the ore attack reaction continues as far as the grains thereof, which significantly increases the reaction speed.

This attack by phosphoric acid thus makes it possible to transfer approximately 78% of the $P_2O_5$ present in the ore into Ca dihydrogenophosphate, which is a very good yield. This can be improved still further, up to approximately 95–98%, by a second attack by $H_3PO_4$ on the cake of impurities, after separation by sedimentation and/or filtration.

Liquid attack containing phosphate ions in solution means a solution or suspension, preferably aqueous, containing phosphoric acid and/or derivatives of phosphoric acid which in the dissolved state generate phosphate ions. The solution or suspension may also contain other ions in solution or have a fraction of insolubles in suspension.

Advantageously, the attack liquid according to the invention is an aqueous solution of phosphoric acid which preferably has a $P_2O_5$ content of 20–35%, advantageously 22% to 32%, in particular 30%.

The attack on the ore and the separation of the liquid phase containing phosphate and calcium ions in solution takes place advantageously at a temperature from 10° to 70° C., preferably from 25° to 45° C., in particular approximately 25° C.

According to an advantageous embodiment of the invention, the separation is effected by settling of the attack product. Preferentially, the separated insoluble solid phase is formed from a solid phase with coarse grains which sediments, the separated liquid phase having in solution phosphate ions and calcium ions comprises an insoluble solid phase suspension with fine grains, and the method also comprises an elimination of the fine grains in suspension by clarification of the separated liquid phase, before the aforementioned step of introduction of the acid. This embodiment allows rapid, inexpensive and extremely thorough separation of the solid phase containing the impurities.

The operations of separation of the solid remainders composed of unattacked and sterile grains (heavy metals) are carried out by the conventional ore processing methods: flocculation, sedimentation, filtration.

The sizing of the equipment necessary for these operations is determined principally by the granulometry of the remainders and their sterile contents.

By way of indication, the compared analysis results of the ore before treatment and the remainders resulting from the settling and/or filtration give the following proportions (in mg/kg) of certain heavy metals.

|    | Ore before treatment | Remainder with fine grains | Remainder with coarse grains |
|----|----------------------|----------------------------|------------------------------|
| Cr | 140 ppm              | 330 ppm                    | 180 ppm                      |
| Al | 0.5%                 | 1.54%                      | 1.18%                        |
| Fe | 0.33%                | 1.96%                      | 0.711%                       |
| F  | 3.5%                 | 16.39%                     | 6.99%                        |
| Si | 2.5%                 | 4.55%                      | 12.8%                        |

According to one improved embodiment of the invention, the method comprises at least one additional attack of the separated solid phase with an additional attack liquid containing phosphate ions in solution, with the formation of at least one additional attack product, and an additional separation thereof between an additional insoluble solid phase and an additional liquid phase containing phosphate ions in solution. It is thus possible to increase the yield of the method and to reduce the volume of the residues still further.

Advantageously, according to the invention, at least part of the attack liquid and/or of the additional attack liquid comprises at least part of the liquid phase resulting from the said separation step and/or from the said additional separation step and/or at least part of the phosphoric acid solution. It is thus possible to perform the attack step by introducing into it, as fresh material, solely ore and a solvent such as water. The attack liquid and the additional attack liquid can be formed solely from one or more recycled liquids, issuing from the method according to the invention itself.

The filtrate resulting from the attack and then separation phases contains calcium dihydrogenophosphate.

In the second phase of the method, the so-called introduction, the filtrate is treated with a strong acid so as to generate phosphoric acid from Ca dihydrogenophosphate by displacing its basic ion.

The various operations taking place in this second phase will result in the production of a phosphoric acid, generally at low concentration (around 30%).

The choice of the strong acid used is determined principally by criteria of an economic nature (availability, security of supplies, cost) and also considerations of an ecological nature relating to the destination of the by-products (storage or use).

The choice of the acid allowing separation of the $H_3PO_4$ depends on the solubility in an aqueous medium of the calcium salt resulting from the attack on the calcium dihydrogenophosphate by this acid.

According to an improved embodiment of the invention, the isolation step comprises, in the separated liquid phase treated with the acid, a solubilisation of the phosphoric acid in an organic solvent, not miscible with water, in order to form an organic phase containing phosphoric acid and an aqueous phase containing the Ca salt in solution and, in the organic phase, extraction with water in order to form the said aqueous solution of phosphoric acid. As an organic solvent it is possible to use any solvent suitable for a liquid-liquid extraction in which the phosphoric acid is soluble and the Ca salt is insoluble under the extraction conditions. As an organic solvent, it is possible advantageously to envisage an aliphatic alcohol, for example n-butanol, etc.

The treatment of the hydrochloric acid advantageously takes place at a temperature of between 10° and 45° C., advantageously between 20° and 30° C., preferably at approximately 25° C.

The treatment with hydrochloric acid can advantageously take place at the same time as the introduction of the organic solvent.

The organic phase issuing from this treatment contains $H_3PO_4$ and HCl. It is separated from the aqueous phase containing $CaCl_2$ in solution and is then advantageously subjected to two successive washing operations.

The first washing with a solution of Ca dihydrogenophosphate can eliminate the HCl. The yield from this operation depends on the $P_2O_5$ content of the solution of Ca dihydrogenophosphate.

The organic phase resulting from this first washing operation can if necessary be purified with a solution of phosphoric acid containing 30% $P_2O_5$, in order to remove the traces of a few residual heavy metals.

The organic phase issuing from these various purification operations now contains only $H_3PO_4$. The extraction of $H_3PO_4$ will be carried out by transfer into aqueous phase by the addition of water to the organic solvent and the separation of the two liquid phases: organic solvent/water. The optimal conditions of this separation will be determined by the use of the ternary diagram $H_3PO_4$—organic solvent—$H_2O$ according to the concentration of $H_3PO_4$ in the organic solvent. At the end of this separation of the two liquid phases, the organic solvent is recycled to a prior stage of the process and $H_3PO_4$ in aqueous solution can be concentrated by distillation.

Advantageously, according to the invention, a fraction of the aqueous solution of acid is recycled in the ore attack phase. The remaining fraction can be concentrated by evaporation in order to give a phosphoric acid, for example of standard quality, in particular with a concentration of 54–60% of $P_2O_5$.

Other advantageous embodiments of the method according to the invention are indicated in the accompanying claims.

The invention will now be described in more detail by reference to the attached drawings and the following examples.

EXAMPLES

Example 1

Phosphoric Attack

An attack is carried out on a phosphate ore having a $P_2O_5$ content of 36.54% and a Ca content of 38.63%. This ore is as extracted. It has only undergone sorting so as to eliminate at a maximum the non-phosphate waste.

It is brought to a reactor provided with a stirrer into which an aqueous solution of phosphoric acid with 30% $P_2O_5$ is introduced. Digestion takes place in the reactor for a period of 15 minutes at ambient temperature with the formation of a mass of attack product in the form of pulp. During this digestion, the phosphoric acid attacks the ore in order to form calcium dihydrogenophosphate $[Ca(H_2PO_4)_2]$, which is soluble in water.

The digestion conditions are established so as to avoid any precipitation of calcium phosphate. These conditions are well known in the art and depend in particular on the temperature applied and the $P_2O_5$ concentration of the acid.

After the attack in the reactor, the pulp undergoes a separation operation. In this example embodiment, this separation comprises first of all a decantation of the pulp in a decanter, where it remains for a period of 10 minutes.

In this way a supernatant liquid containing fine grains in suspension is obtained. In this example embodiment, the liquid is then subjected to clarification by filtration through a filter paper. The filtrate obtained (Sample 1) is an aqueous solution of phosphoric acid at approximately 30.5% $PO_2$, which contains 3.26% Ca and largely contains no impurities, such as Fe, F, Si etc. This filtrate at least partly forms the liquid phase which, according to the invention, will be subjected to treatment with an acid.

In order to increase the yield, it is also possible to provide for washing with water of the deposit of coarse grains which has sedimented at the bottom of the decanter. In this example embodiment, four successive washings have been provided, each with water, for five minutes, and then a filtration. A cake of washed coarse grains is obtained (Sample 3).

The supernatant from each of the washings and the filtrate are combined and once again filtered. In this way a cake of fine grains (Sample 2) and a liquid filtrate (Sample 4) are obtained.

The proportions of various materials of the products of this attack were analysed and are indicated in Table I below.

TABLE I

| Product | $P_2O_5$ % | Ca % | Fe ppm | F % | Si % |
|---|---|---|---|---|---|
| Ore | 36.54 | 38.63 | 3320 | 3.5 | 2.5 |
| Sample 1 | 30.52 | 3.26 | 28 | 0.0779 | — |
| Sample 2 | 32.94 | 19.01 | 25064 | 16.39 | 4.55 |
| Sample 3 | 26.61 | 29.99 | 11906 | 6.99 | 12.8 |
| Sample 3 | 1.64 | 0.2568 | 2 | — | — |

As can easily be seen, the product Sample 1, which is the sample of the liquid phase which will subsequently undergo treatment with an acid, now contains only traces of impurities and has a $P_2O_5$ content of approximately 30%.

Example 2

Phosphoric Attack

Figure 1:
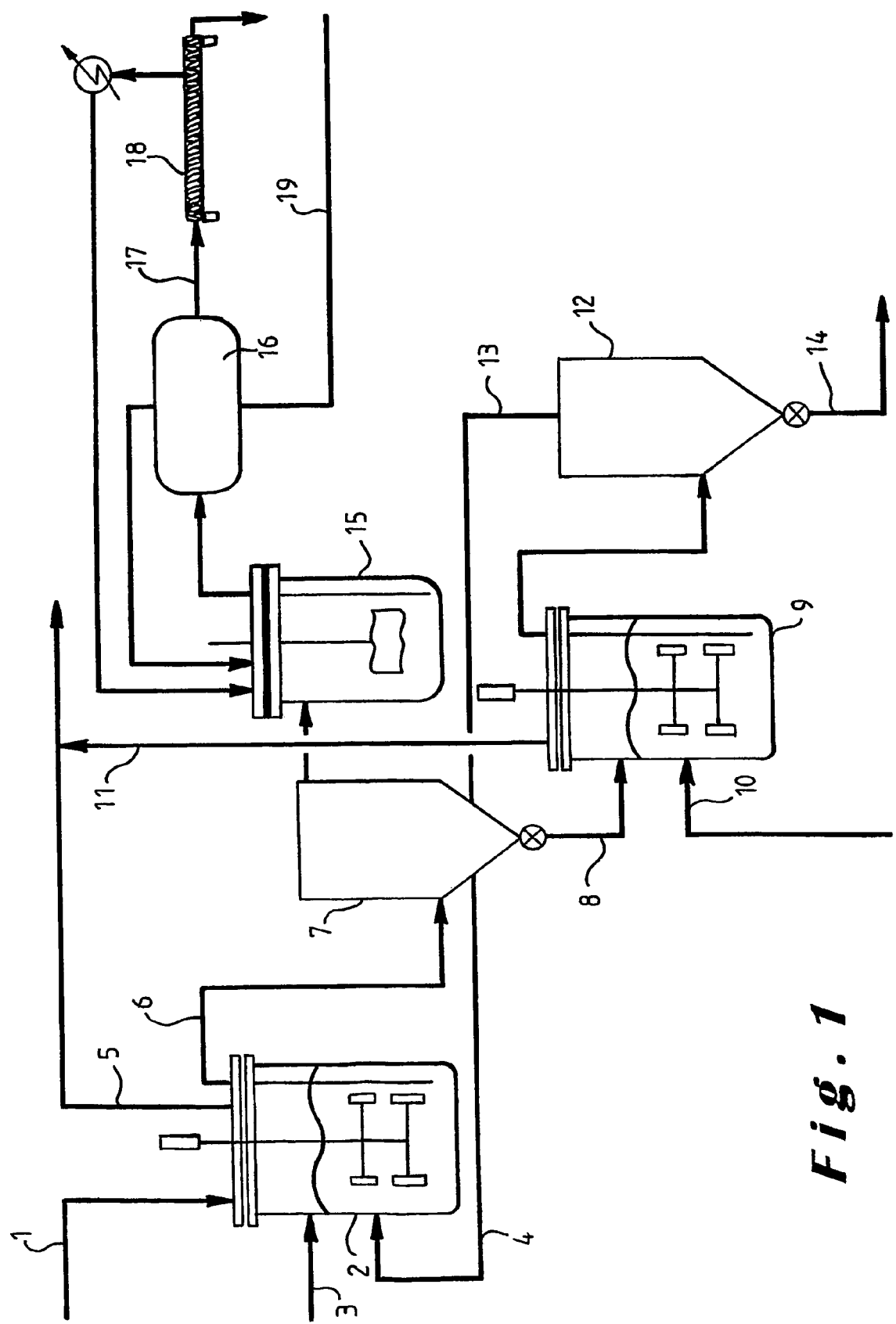
FIG. 1 depicts an apparatus for producing phosphoric acid according to the present invention.

It is also possible to provide a variant embodiment according to the invention in an ore phosphoric attack installation as illustrated in the accompanying FIG. 1.

A phosphate ore is fed at 1 into a reactor 2 at which, at 3, there are introduced water and an attack liquid containing phosphate ions. A pipe 5 discharges $CO_2$ gas through the top of the reactor.

After digestion in the first reactor 2, the pulp formed is transferred through the pipe 6 into a first decanter 7, in which the coarse grains of the pulp formed in the reactor 2 sediment.

The deposit of sedimented coarse grains is discharged through the bottom of the decanter at 8 in order to be transferred into a second reactor 9 in which this deposit is subjected to an additional attack by an attack liquid containing phosphate ions. This attack liquid is here part of the phosphoric acid solution produced according to the invention and is fed at 10 into the reactor 9. A drain pipe 11 discharges the $CO_2$ gas formed at the top of this reactor. The pulp formed is transferred into a second decanter 12. The deposit in the second decanter is discharged at 14 in the form of a cake. The supernatant from the decanter 12 is sucked out of it at 13 and will, in this example embodiment, serve as an attack liquid containing phosphate ions to be introduced into the first reactor 2.

The supernatant of the first decanter 7 is sucked into a mixer 14 into which an organic phase is introduced, for example an aliphatic alcohol, in the example illustrated n-butanol. This organic phase must preferably be insoluble in water and lighter than water and have a repelling effect vis-à-vis the insoluble fine particles which are in suspension in the supernatant from the decanter 7. The mixture obtained in the mixture 15 is then transferred into a clarifier 16 in which the insoluble fine particles are concentrated at the interface between the organic phase and the aqueous phase. This layer of insoluble fine particles is discharged at 17 to a drying device 18, from which they are discharged. The clarified aqueous phase, formed by an aqueous solution of phosphoric acid containing calcium ions in solution, is discharged in the bottom of the clarifier 16 through the pipe 19, through which it is transferred to an installation for treatment with an acid, such as the installation illustrated in FIG. 2.

Example 3

Treatment with Hydrochloric Acid

Figure 2:
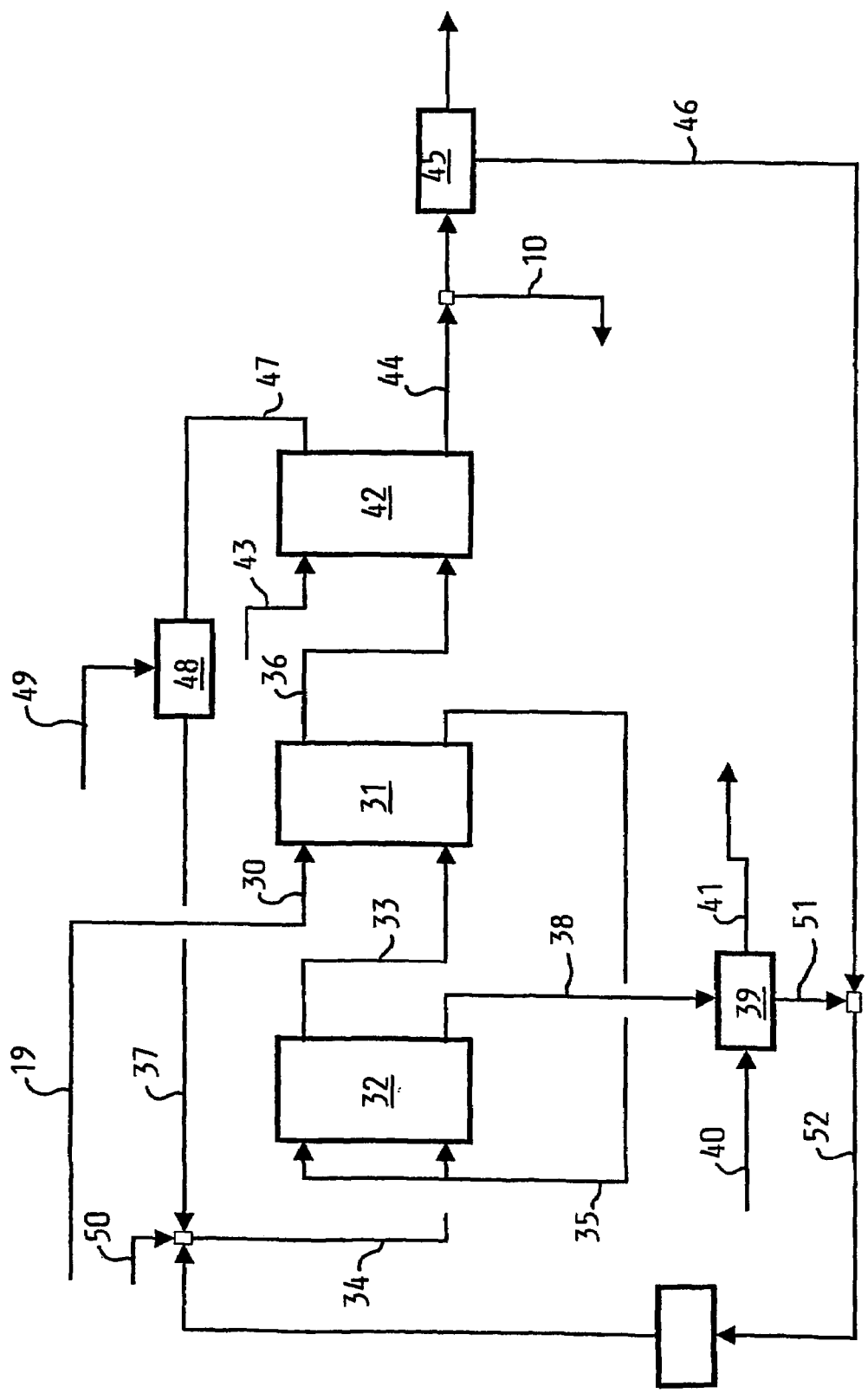
FIG. 2 depicts an apparatus for acid treatment of an aqueous solution of phosphoric acid containing calcium ions discharged from the apparatus of FIG. 1.

The liquid issuing from the phosphoric attack and having phosphate ions and calcium ions in solution is in this example brought by the pipe 19, at 30, to a washing column 31 (see FIG. 2). Into this column 31 there is also introduced an organic phase based for example on butanol, which already contains phosphoric acid (12% $P_2O_5$) mixed with chloride ions (4% $Cl^-$).

This organic phase comes from the liquid-liquid extraction column 32 and is fed to the column 31 through the pipe 33. An aqueous solution of calcium dihydrogenophosphate leaves at the bottom of the washing column 31 through the pipe 35 whilst at the top of the column an organic phase is discharged through the pipe 36.

Table II illustrates the compositions of the phases at the inlet and outlet of the column 31.

TABLE II

|  |  | $P_2O_5$ % | Cl % | Ca % |
|---|---|---|---|---|
| Starting solution | organic phase Flow 33 | 10.28 | 4.06 | 0.24 |
|  | aqueous phase Flow 30 | 31.26 | 0 | 3.45 |
| After equilibrium | organic phase Flow 36 | 11 | 0.21 | 0.1227 |
|  | aqueous phase Flow 35 | 26 | 5.25 | 2.86 |

|  | Fe ppm | As ppm | F ppm |
|---|---|---|---|
| Flow 36 | 17.58 | <0.1 | 1642 |
| Flow 35 | 104.5 | 0.26 | 818 |

The column 32 contains several exchange stages providing a transfer of chloride ions present in an organic phase to an aqueous phase.

The organic phase in the column 32 consists of butanol solvent and is introduced therein through the pipe 34. This organic phase has previously been 548% loaded with HCl through the pipe 37 in particular. The aqueous phase in the column 32 consists of an aqueous solution of calcium dihydrogenophosphate coming from the washing column 31 and fed through the pipe 35.

When the two flows pass in counter current, the phosphoric acid from the aqueous phase passes to the organic phase, which is fed by the pipe 33 to the column 31. The salt formed $CaCl_2$ on the contrary remains in the aqueous phase, which is discharged at the bottom of the column 32 through the pipe 38. This aqueous phase is deprived of its $H_3PO_4$ (<1% of $P_2O_5$) through the effect of the liquid-liquid extraction. The flow from the pipe 38 is routed to a stripping reactor 39 for recovery of the traces of solvent entrained. Steam is introduced into the reactor 39 through the pipe 40. A solution of $CaCl_2$ is recovered at 41 and the traces of solvent are recirculated through the conduits 51 and 52 to the organic phase supply of the column 32.

Table III illustrates the compositions of the phases at the inlet and outlet of the column 32.

TABLE III

|  |  | $P_2O_5$ % | Cl % | Ca % |
|---|---|---|---|---|
| Starting solution | organic phase Flow 34 | 0 | 4.8467 | 0 |
|  | aqueous phase Flow 35 | 19.1 | 5.8 | 2.09 |
| After equilibrium | Organic phase Flow 33 | 11.76 | 4.37 | 0.02482 |
|  | Aqueous phase Flow 38 | 0.92 | 13.55 | 5.04 |

|  | Fe ppm | As ppm | F ppm |
|---|---|---|---|
| Flow 33 | 22.61 | <0.1 | 652 |
| Flow 38 | 172 | 0.015 | 1392 |

In order to re-extract the $P_2O_5$ of the organic phase leaving through the pipe 36 of the washing column 31, the said phase is introduced into a re-extraction column 42 into which water is introduced through the pipe 43.

In this way an aqueous phase of phosphoric acid is formed which is discharged through the pipe 44. This solution can be partially recycled to the phosphoric attack, for example through the pipe 10 (see also FIG. 1). It can also be concentrated in the concentrator 45 and be used in a subsequent process or be recycled through the pipe 46 to the supply to the column 32.

There is also discharged from this column 42, at 47, an organic phase which is taken to the mixer 48, in which fresh hydrochloric acid is fed through the pipe 49. Fresh organic solvent can be added to the mixture leaving the mixer 48 through the pipe 37, for example at 50.

Table IV illustrates the compositions of the phases at the inlet and outlet of the column 42.

TABLE IV

|  |  | $P_2O_5$ % | Cl % |
|---|---|---|---|
| Starting solution | organic phase Flow 34 | 13.42 | 0.36 |
|  | Aqueous phase Flow 43 | 0 | 0 |
| Outlet | Organic phase Flow 47 | 13.21 | 0.2464 |
|  | Aqueous phase Flow 44 | 27.88 | 0.6668 |

It must be understood that the present invention is in no way limited to the embodiments described above and that many modifications can be made thereto without departing from the scope of the claims which follow.

The invention claimed is:

1. Method of producing phosphoric acid, comprising:
   attacking a phosphate ore with an attack liquid containing phosphate ions in solution to form an attack product, and
   separating the attack product into an insoluble solid phase containing impurities and a liquid phase containing phosphate ions and calcium ions in solution,
   adding an acid which is stronger than the phosphoric acid into the separated liquid phase to combine with the calcium ions and form a soluble calcium salt, and
   isolating a solution, of said calcium salt, not contaminated by the impurities, and a solution of phosphoric acid.

2. Method according to claim 1, wherein said attack liquid containing phosphate ions in solution is an aqueous solution of phosphoric acid.

3. Method according to claim 2, wherein the aqueous solution of phosphoric acid has a 20–35% $P_2O_5$ content.

4. Method according to claim 1, wherein the separating comprises a settling of the attack product, a drawing off of the liquid phase in the form of supernatant, and a discharge of the insoluble solid phase after sedimentation.

5. Method according to claim 1, wherein the separated insoluble solid phase is formed from a solid phase with coarse grains which sediments, wherein the separated liquid phase having phosphate ions and calcium ions in solution comprises a suspension of insoluble solid phase with fine grains, and wherein the method also comprises an elimination of the fine grains in suspension by clarification in the separated liquid phase, before the introduction of the acid.

6. Method according to claim 1, including at least one additional attack of said separated solid phase by an additional attack liquid containing phosphate ions in solution, with the formation of at least one additional attack product, and an additional separation thereof between an additional insoluble solid phase and an additional liquid phase containing phosphate ions in solution.

7. Method according to claim 1, wherein the separated liquid phase has a $P_2O_5$ content of 25% to 35% and a Ca content of 2% to 50%.

8. Method according to claim 6, wherein at least some of the attack liquid and/or of the additional attack liquid comprises at least some of the liquid phase resulting from the separation step and/or from the additional separation step and/or at least some of the phosphoric acid solution.

9. Method according to claim 1, wherein the acid is an aqueous solution of hydrochloric acid.

10. Method according to claim 1, wherein the isolation step comprises, in the separated liquid phase treated with acid, a first extraction by an organic solvent in order to form an organic phase containing phosphoric acid and an aqueous phase containing the Ca salt in solution and, in the organic phase, a second extraction by water in order to form an aqueous solution of phosphoric acid.

11. Method according to claim 7, wherein temperature conditions are maintained throughout the method between 20° and 40° C. and the $P_2O_5$ concentration is maintained between 35% and 35%.

12. Method according to claim 1, including a step of concentrating the phosphoric acid solution.

* * * * *